(12) United States Patent
Wilkie et al.

(10) Patent No.: US 12,282,985 B2
(45) Date of Patent: Apr. 22, 2025

(54) USER SELECTABLE DIMENSION UNGROUPING FOR ENTERPRISE CLOUD ANALYTIC CHARTS

(71) Applicant: SAP SE, Walldorf (DE)

(72) Inventors: Robert Wilkie, Vancouver (CA); Gloria Law, Vancouver (CA); Yue Qian Huang, Vancouver (CA)

(73) Assignee: SAP SE, Walldorf (DE)

( * ) Notice: Subject to any disclaimer, the term of this patent is extended or adjusted under 35 U.S.C. 154(b) by 156 days.

(21) Appl. No.: 18/062,256

(22) Filed: Dec. 6, 2022

(65) Prior Publication Data
US 2024/0185489 A1    Jun. 6, 2024

(51) Int. Cl.
| G06T 15/00 | (2011.01) |
| G06F 3/0482 | (2013.01) |
| G06F 16/26 | (2019.01) |
| G06T 11/00 | (2006.01) |
| G06T 11/20 | (2006.01) |
| H04L 67/60 | (2022.01) |

(52) U.S. Cl.
CPC .......... G06T 11/206 (2013.01); G06F 3/0482 (2013.01); G06F 16/26 (2019.01); G06T 11/001 (2013.01); H04L 67/60 (2022.05); *G06T 2200/24* (2013.01)

(58) Field of Classification Search
CPC ....... H04L 67/60; G06F 16/26; G06F 3/0482; G06T 2200/24; G06T 11/206; G06T 11/001
USPC .......................................................... 345/418
See application file for complete search history.

(56) References Cited

U.S. PATENT DOCUMENTS

| 10,956,989 | B2* | 3/2021 | Baker | G06Q 40/10 |
| 11,301,811 | B2* | 4/2022 | Marom | G06F 16/909 |
| 2006/0112123 | A1* | 5/2006 | Clark | G06F 40/18 |
| 2011/0310112 | A1* | 12/2011 | Zolotovitski | G06T 11/206 |
| | | | | 345/589 |

(Continued)

OTHER PUBLICATIONS

Mahajan KN, Gokhale LA. Advanced charting techniques of Microsoft excel 2016 aiming visualization. International Journal of Computer Sciences and Engineering (IJCSE). 2019;7(1).*

(Continued)

*Primary Examiner* — Phu K Nguyen
(74) *Attorney, Agent, or Firm* — Buckley, Maschoff & Talwalkar LLC

(57) ABSTRACT

An analytic chart data store may contain an enterprise information data structure, based on a result set received from a back-end application computer server, and a user selectable dimension ungrouping indication. The enterprise information data structure may include: an outermost dimension arranged on a row axis; an innermost dimension arranged on the row axis; and measure values arranged on the row axis. A computer processor of an analytic chart creation platform may determine that the user selectable dimension ungrouping indication is set to "ungroup." Responsive to said determination, the analytic chart creation platform may automatically re-organize the enterprise information structure such that the innermost dimension information is arranged on the column axis instead of the row axis. The analytic chart creation platform may then automatically create an analytic chart and transmit the chart to a remote user device.

16 Claims, 20 Drawing Sheets

(56) References Cited

U.S. PATENT DOCUMENTS

2021/0342399 A1* 11/2021 Sisto ................ G06F 16/90332

OTHER PUBLICATIONS

Hora JM, Kronz A, Möller-McNett S, Wörner G. An Excel-based tool for evaluating and visualizing geothermobarometry data. Computers & geosciences. Jul. 1, 2013;56:178-85.*

Excel Board, How to Create Multi-Category Chart in Excel, Jun. 14, 2017, https://www.youtube.com/watch?v=cozNbt5HhZ4.*

* cited by examiner

FIG. 2

Color Dimension on Row Axis Example

| Name Dimension (Outermost Dimension) | Location (Color) (Innermost Dimension) | Measure |
|---|---|---|
| Name O | Ottawa | -22,000 |
| Name O | Vancouver | -2,000 |
| Name R | Denver | -50,000 |
| Name R | Ottawa | -23,000 |
| Name R | Seattle | 36,000 |
| Name R | Vancouver | -44,000 |
| Name Y | Seattle | -52,000 |
| Name Y | Vancouver | 25,000 |

Rows →

Columns (Dimensions) ↑

200

After a Descending Measure Sort

| Name Dimension (Outermost Dimension) | Location (Color) (Innermost Dimension) | Measure |
|---|---|---|
| Name O | Vancouver | -2,000 |
| Name O | Ottawa | -22,000 |
| Name Y | Vancouver | 25,000 |
| Name Y | Seattle | -52,000 |
| Name R | Seattle | 36,000 |
| Name R | Ottawa | -23,000 |
| Name R | Vancouver | -44,000 |
| Name R | Denver | -50,000 |

USER SELECTABLE DIMENSION UNGROUPING FOR ENTERPRISE CLOUD ANALYTIC CHARTS

BACKGROUND

A user may perform analytics in connection with enterprise information. The information might be stored in a cloud-based environment such as the SAP® Analytics Cloud that combines analytics and planning along with integration to other applications and access to heterogeneous data sources. For example, the user may compare income amounts, profit, spending, etc. for various geographic regions or organizations within the enterprise. Such analysis may let the user make resource allocation decisions, predict future performance, etc. One way the user may receive the enterprise information is via one or more analytic charts (e.g., comparison charts, trend charts, distribution charts, correlation charts, indicator charts, etc.). For example, a bar chart might show various costs associated with a product over a user-defined time period (e.g., during the last four fiscal quarters). It is important that a user can customize these types of analytic charts to show the information in an understandable fashion. Because a large number of charts and/or a substantial amount of enterprise information might be involved (e.g., representing millions of electronic records), manually customizing analytic charts may be impractical. It would be desirable to provide flexible analytic charts in an automatic and appropriate manner.

SUMMARY

Methods and systems may be associated with cloud-based enterprise analytics. An analytic chart data store may contain an enterprise information data structure, based on a result set received from a back-end application computer server, and a user selectable dimension ungrouping indication. The enterprise information data structure may include: an outermost dimension arranged on a row axis; an innermost dimension arranged on the row axis; and measure values arranged on the row axis. A computer processor of an analytic chart creation platform may determine that the user selectable dimension ungrouping indication is set to "ungroup." Responsive to said determination, the analytic chart creation platform may automatically re-organize the enterprise information structure such that the innermost dimension information is arranged on the column axis instead of the row axis. The analytic chart creation platform may then automatically create an analytic chart and transmit the chart to a remote user device.

Some embodiments comprise: means for accessing, by a computer processor of an analytic chart creation platform, an analytic chart data store that contains an enterprise information data structure based on a result set received from a back-end application computer server and a user selectable dimension ungrouping indication, wherein the enterprise information data structure includes: an outermost dimension arranged on a row axis, an innermost dimension arranged on the row axis, and measure values arranged on the row axis; means for determining that the user selectable dimension ungrouping indication is set to "ungroup;" responsive to said determination, means for automatically re-organizing the enterprise information structure such that the innermost dimension information is arranged on the column axis instead of the row axis; means for automatically creating an analytic chart based on the re-organized enterprise information data structure; and means for transmitting the created analytic chart to a remote user device via a distributed communication network.

Some technical advantages of some embodiments disclosed herein are improved systems and methods to provide flexible analytic charts in an automatic and appropriate manner.

BRIEF DESCRIPTION OF THE DRAWINGS

FIG. 2 is an enterprise information data structure according to some embodiments.

FIGS. 4 and 5 illustrate an analytics sort according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
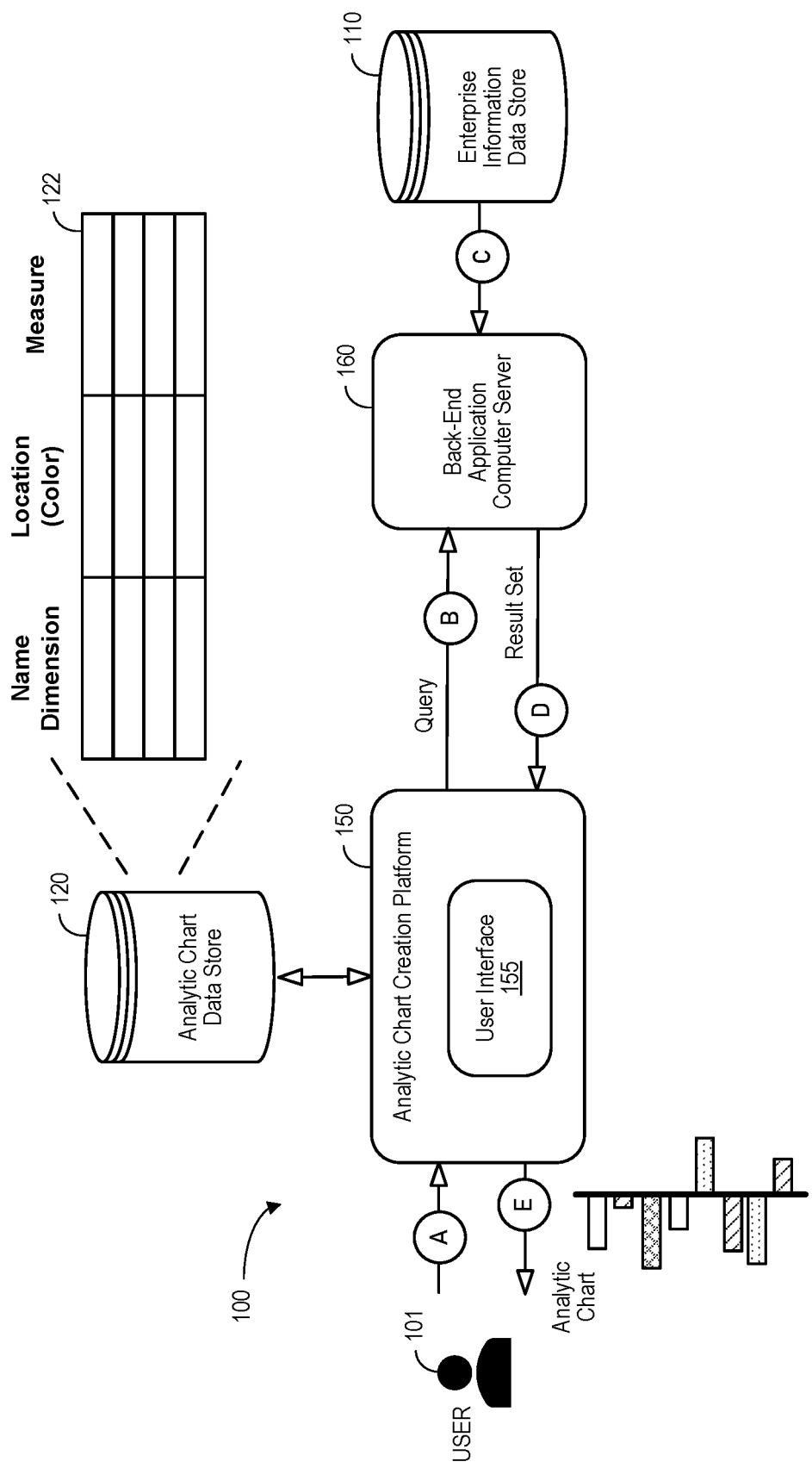
FIG. 1 is high-level diagram of an enterprise cloud analytics system in accordance with some embodiments.

FIG. 1 is an enterprise cloud analytics system 100 in accordance with some embodiments. An analytic chart creation platform 150 may exchange information with a back-end application computer server 160 that can access an enterprise information data store 110. The back-end application computer server 160 and/or enterprise information data store 110 might be associated with, for example, an SAP® HANA Database-as-a-Service ("DBaaS") and/or Business Intelligence ("BI") cloud-based platform. A user 101 may provide information to an analytics creation platform 150 at (A) (e.g., via a user interface 155). The analytic chart creation platform 150 may access information in an analytic chart data store 120, such as an enterprise information data structure 122. Based on the information received from the user 101 the analytic chart creation platform 150 constructs an appropriate query that is provided to the back-end application computer server 160 at (B). The back-end application computer server 160 executes the query to retrieve the appropriate information from the enterprise information store 110 at (C) and transmits a result set to the analytic chart creation platform 150 at (D). The result set and other information in the analytic chart data store 120 may then be used to automatically provide an appropriate analytic chart to the user at (E). As used herein, the term "automatic" may refer to an operation that is performed with little or no human intervention.

Devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The system 100 may store information into and/or retrieve information from various data stores (e.g., the analytic chart data store 120), which may be locally stored or reside remote from the analytic chart creation platform 150. Although a single analytic chart creation platform 150 is shown in FIG. 1, any number of such devices may be included. Moreover, various devices described herein might be combined according to embodiments of the present invention. For example, in some embodiments, the analytic chart creation platform 150 and analytic chart data store 120 might comprise a single apparatus. The system 100 functions may be performed by a constellation of networked apparatuses, such as in a distributed processing or cloud-based architecture.

A user may access the system 100 via a remote device (e.g., a Personal Computer ("PC"), tablet, or smartphone) to view information about and/or manage operational information in accordance with any of the embodiments described herein. In some cases, an interactive display of the graphical user interface 155 may let an operator or administrator define and/or adjust certain parameters (e.g., to implement various mapping and preferences) and/or provide or receive automatically generated recommendations, alerts, or results from the system 100.

FIG. 2 is an enterprise information data structure 200 according to some embodiments. The enterprise information data structure 200 might be associated with, for example, a result set generated by a back-end application computer server in response to a query. The result set of a data source can be represented a two-dimensional table with a column axis and a row axis. Each axis has a list of dimensions, and one dimension can contain measures. Each dimension has dimension members (or simply "members"), and the dimension members on an axis form an axis tuple at each axis position (the intersection of each row and column may contain a data value). In the example data structure 200 of FIG. 2, the chart includes an outermost "NAME" dimension arranged on a row axis and an innermost "LOCATION" or color dimension arranged on the row axis ("Ottawa," "Vancouver," etc.). Measure values (e.g., income amounts) are also arranged on the row axis.

Figure 3:
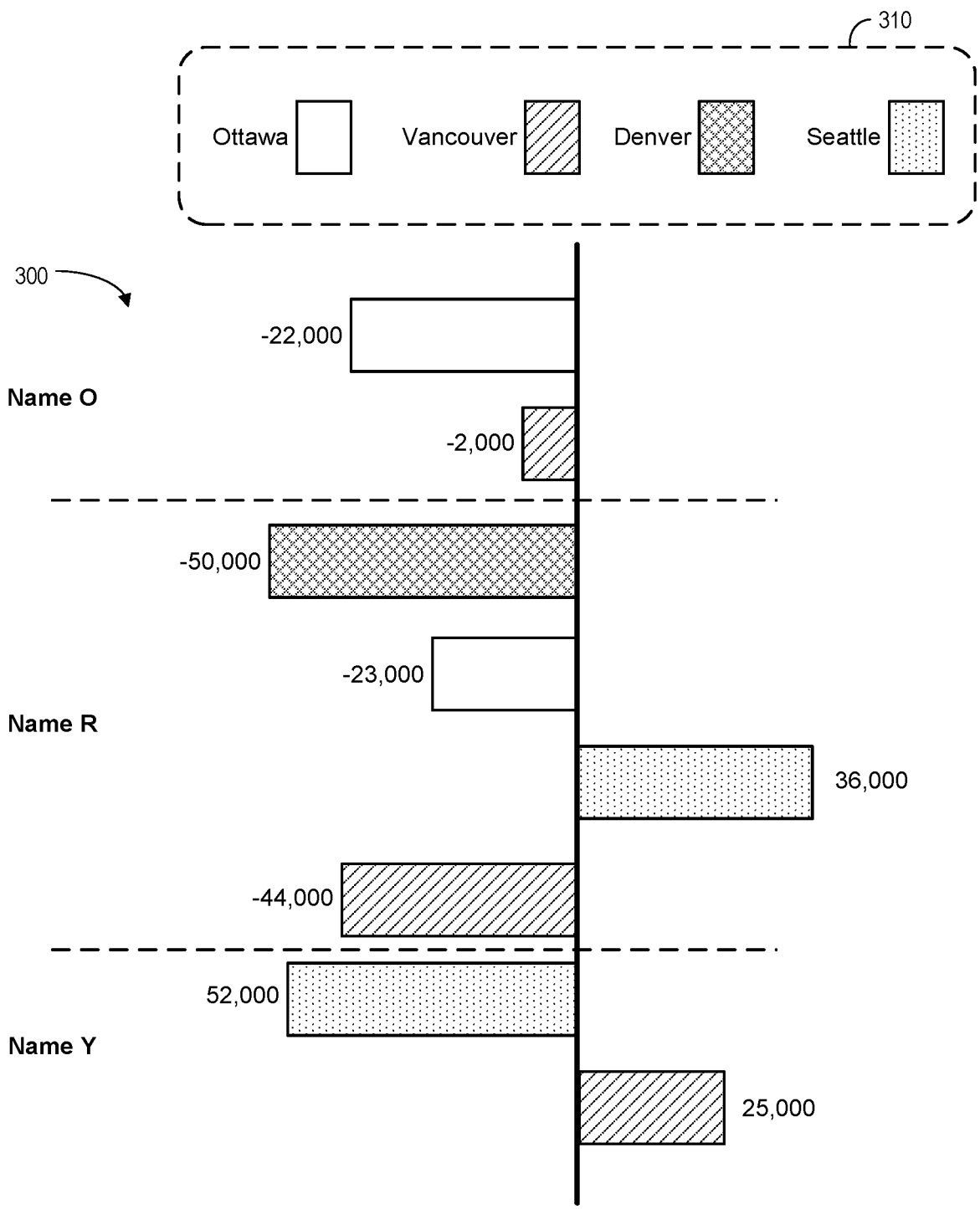
FIG. 3 is an analytic chart in accordance with some embodiments.

FIG. 3 is an analytic chart 300 that might be created using the information in the data structure 200 of FIG. 2 in accordance with some embodiments. In the chart 300, the income values are presented graphically as bars for each location of each of the category names. Moreover, a legend 310 shows the user how each bar maps to a location (e.g., a particular type of cross-hatching is associated with "Vancouver"). Note that the order of the locations in the legend 310 is based on their appearance in the underlying data structure 200 (that is, "Ottawa" appears first in the data structure 200 and is therefore first in the legend 310). Note, however, that a user might prefer that a different order be used in the legend 310. For example, the user might instead want the locations to appear in alphabetical order.

Figure 5:
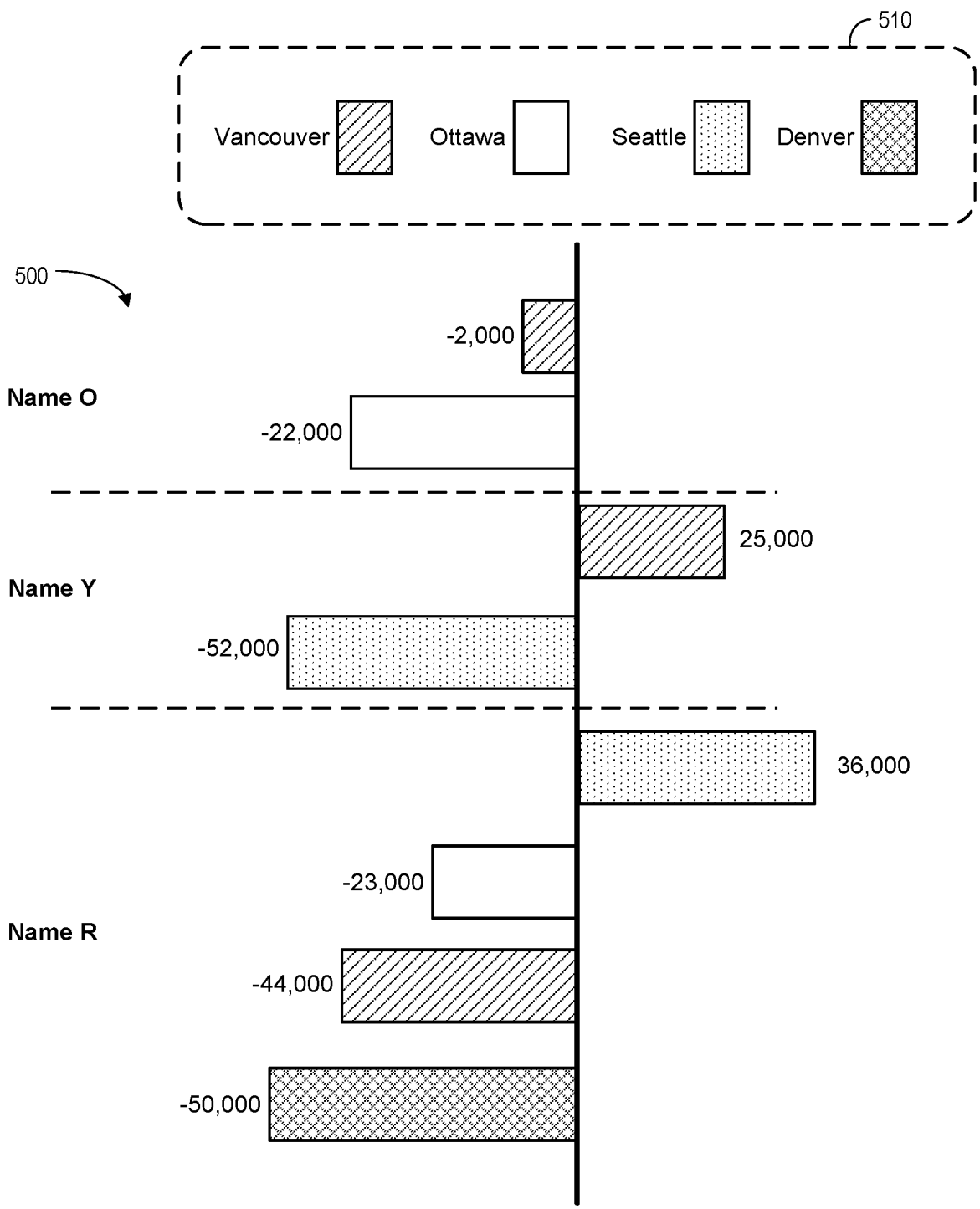

In some cases, operations might be performed on the underlying data structure 200. For example, FIGS. 4 and 5 illustrate an analytics sort according to some embodiments. In particular, FIG. 4 shows the enterprise information data structure 200 of FIG. 2 after a descending measure sort operation has been performed (e.g., based on the income values). As before, FIG. 5 is an analytic chart 500 that might be created using the information in the data structure 400 of FIG. 4 in accordance with some embodiments. Moreover, a legend 510 shows how each bar maps to a location. Once again, the order of the locations in the legend 510 is based on their appearance in the underlying data structure 400 (that is, "Vancouver" appears first in the data structure 400 and is therefore first in the legend 510). That is, the locations in the legend 510 are still not in alphabetical order.

Figure 6:
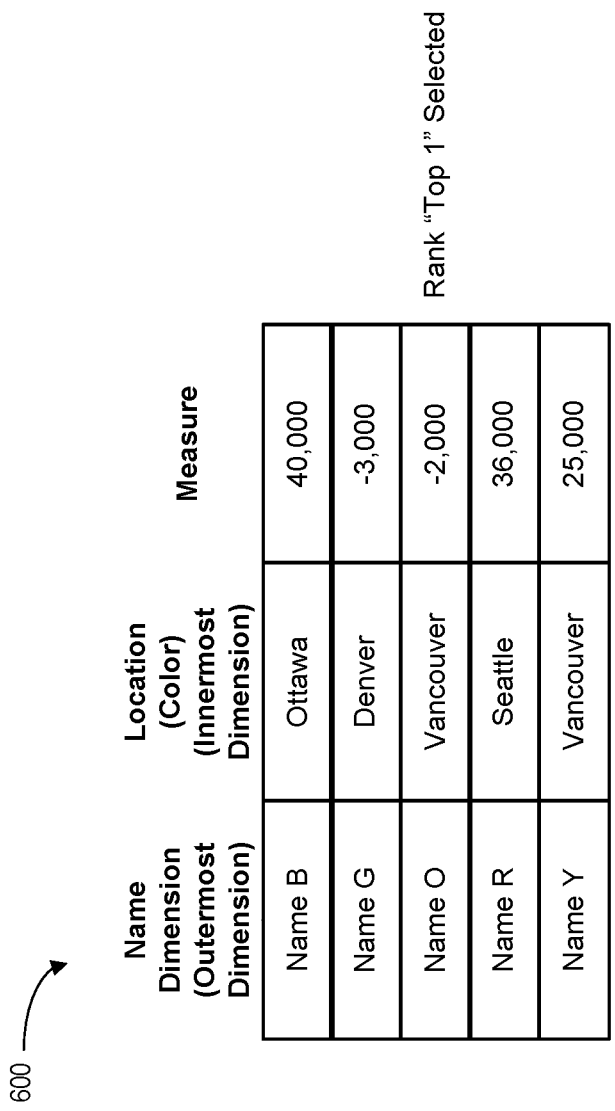
FIGS. 6 and 7 illustrate analytics ranking in accordance with some embodiments.
Figure 7:
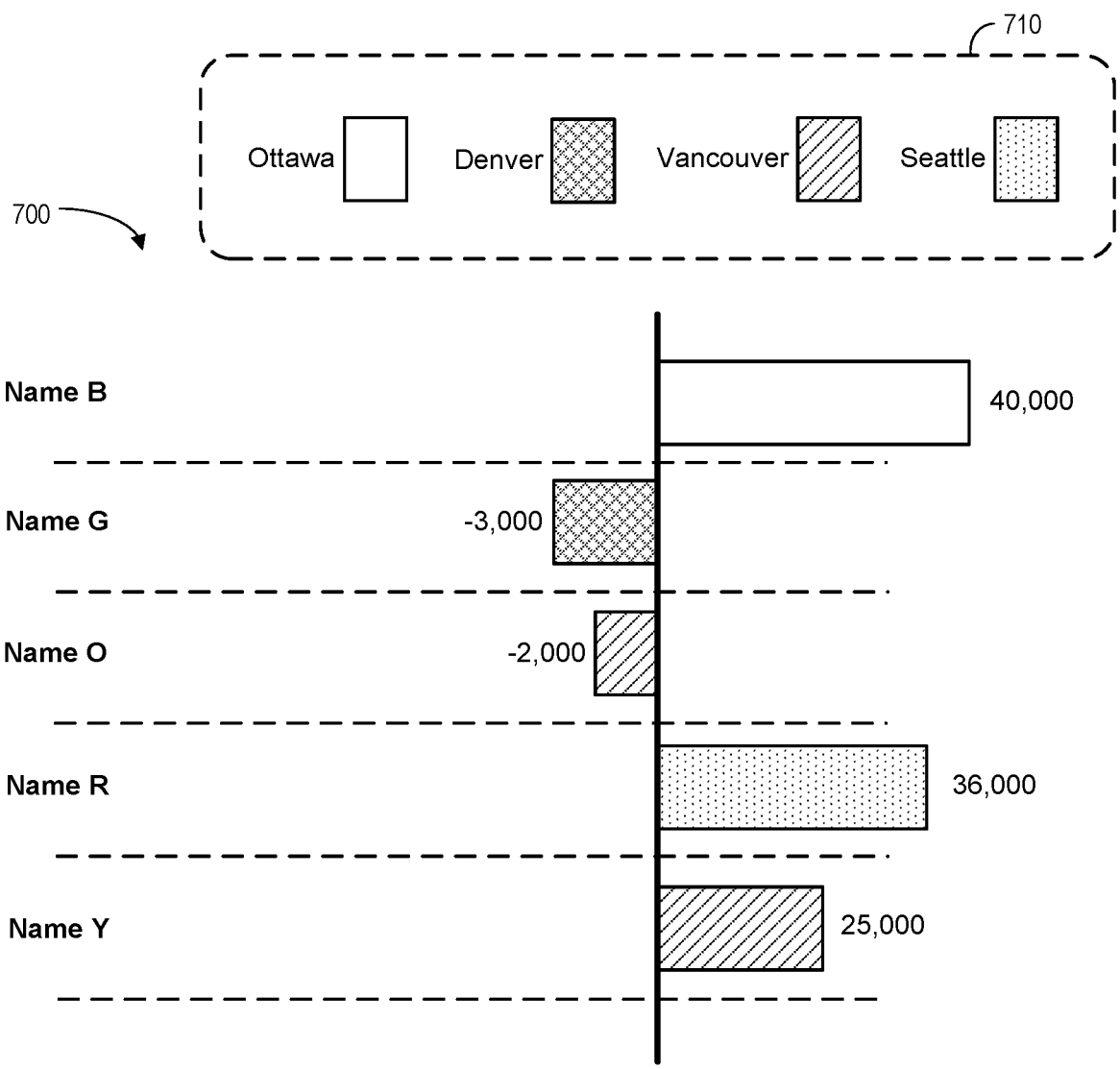

FIGS. 6 and 7 illustrate analytics ranking in accordance with some embodiments. FIG. 6 shows the enterprise information data structure 400 of FIG. 4 after a ranking operation has been performed (e.g., requesting that only the "top 1" income be shown). Note that this query might result in the back-end application computer server including new names in the data structure 600 (e.g., "Name B" and "Name G"). As before, FIG. 7 is an analytic chart 700 that might be created using the information in the data structure 600 of FIG. 6 in accordance with some embodiments. Moreover, a legend 710 shows how each bar maps to a location. Once again, the order of the locations in the legend 710 is based on their appearance in the underlying data structure 600 (that is, "Ottawa" appears first in the data structure 600 and is therefore first in the legend 710). The locations in the legend 710 are still not in alphabetical order.

Figure 8:
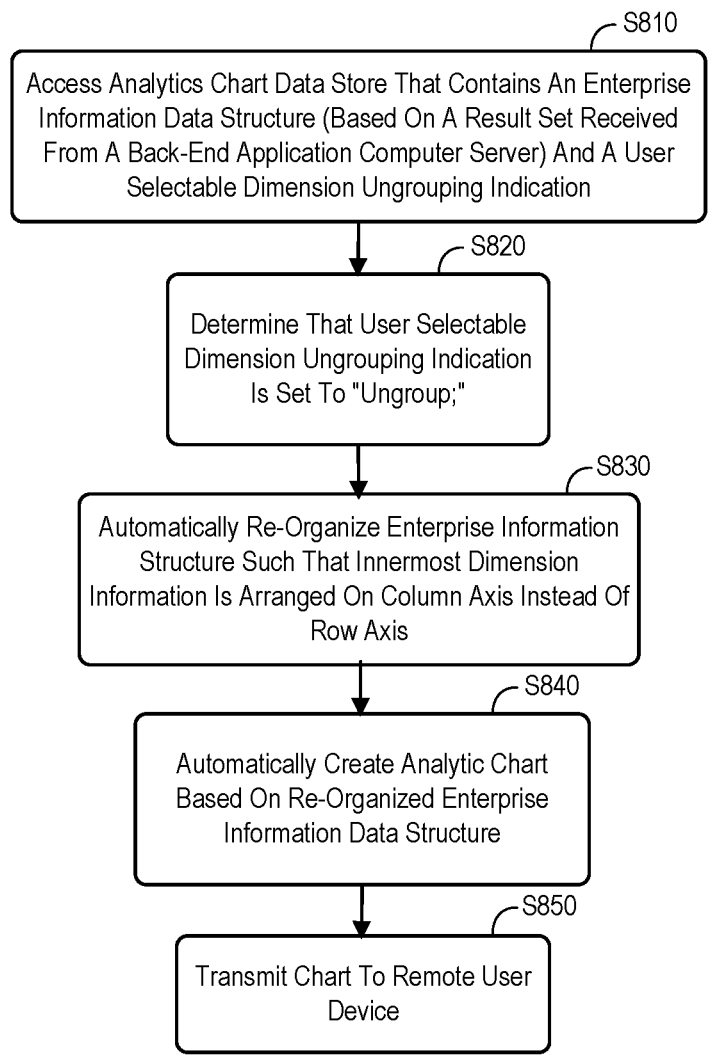
FIG. 8 is a method according to some embodiments.

FIG. 8 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S810, a computer processor of an analytic chart creation platform may access an analytic chart data store. The analytic chart data store contains an enterprise information data structure based on a result set received from a back-end application computer server. The analytic chart data store may also include a user selectable dimension ungrouping indication (described in connection with FIGS. 9 through 12). The enterprise information data structure includes:

- An outermost dimension arranged on a row axis.
- An innermost dimension arranged on the row axis (e.g., an enterprise color feed). Note that embodiments could have multiple dimensions on a category feed as well as a color feed. When color dimensions are on the row axis, they as a group will still be innermost, and using the "ungroup" option may move all color dimensions to the column axis.
- Measure values arranged on the row axis.

At S820, the system may determine that the user selectable dimension ungrouping indication is set to "ungroup." Responsive to this determination, at S830 the system may automatically re-organize the enterprise information structure such that the innermost dimension information is arranged on the column axis instead of the row axis (e.g., by adjusting a query to the back-end application computer server). According to some embodiments, the analytic chart creation platform performs sort and/or rank operations on the re-organized enterprise information data structure.

An analytic chart may then be automatically created based on the re-organized enterprise information data structure at S840. At S850, the computer server may transmit the created analytic chart to a remote user device via a distributed communication network. According to some embodiments, the analytic chart creation platform may subsequently determine that that the user selectable dimension ungrouping indication has changed to "group" and again re-organize the enterprise information data structure such that the innermost dimension information is arranged on the row axis instead of the column axis.

Figure 9:
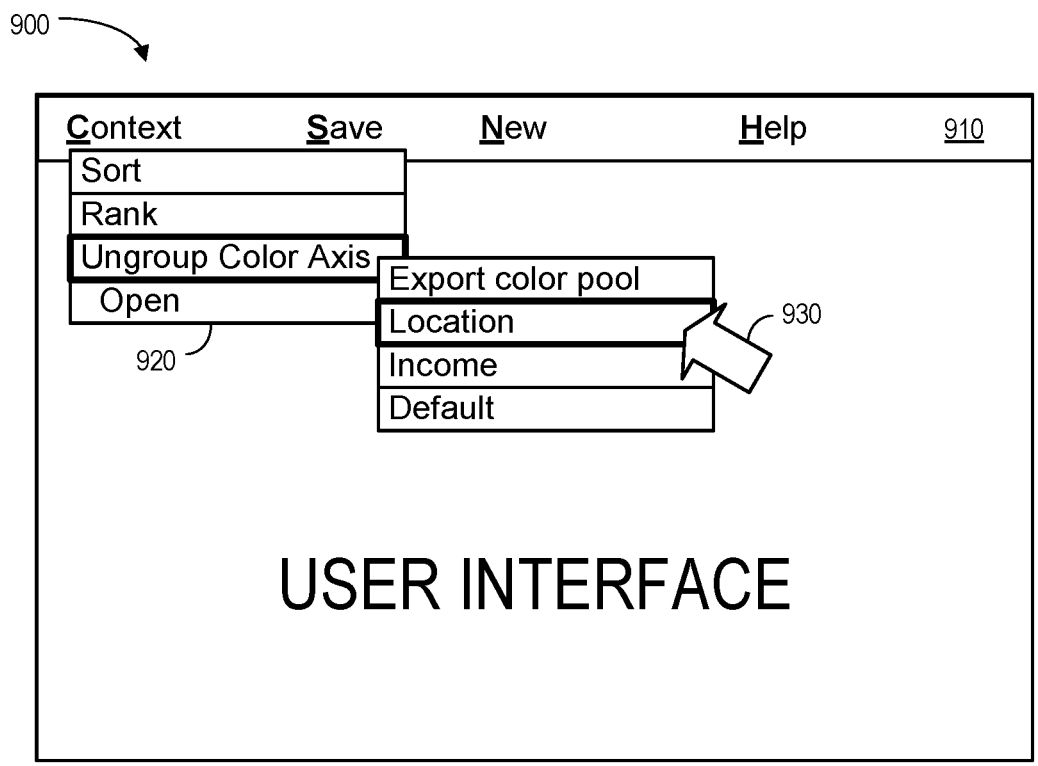
FIG. 9 illustrates a user interface according to some embodiments.
Figure 10:
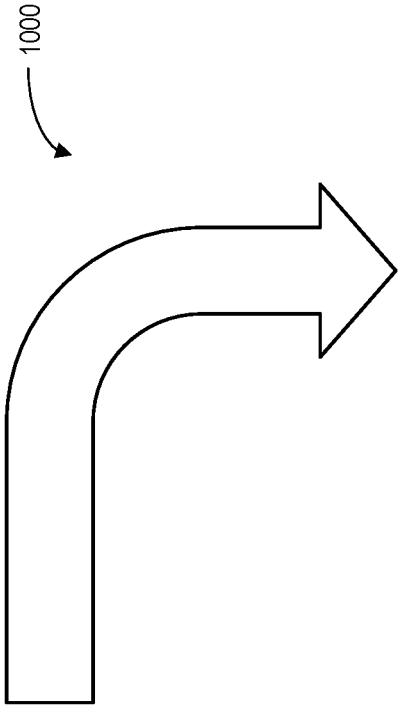
FIG. 10 illustrates an enterprise information data structure re-organization in accordance with some embodiments.
Figure 11:
FIG. 11 is a re-organized enterprise information data structure according to some embodiments.
Figure 12:
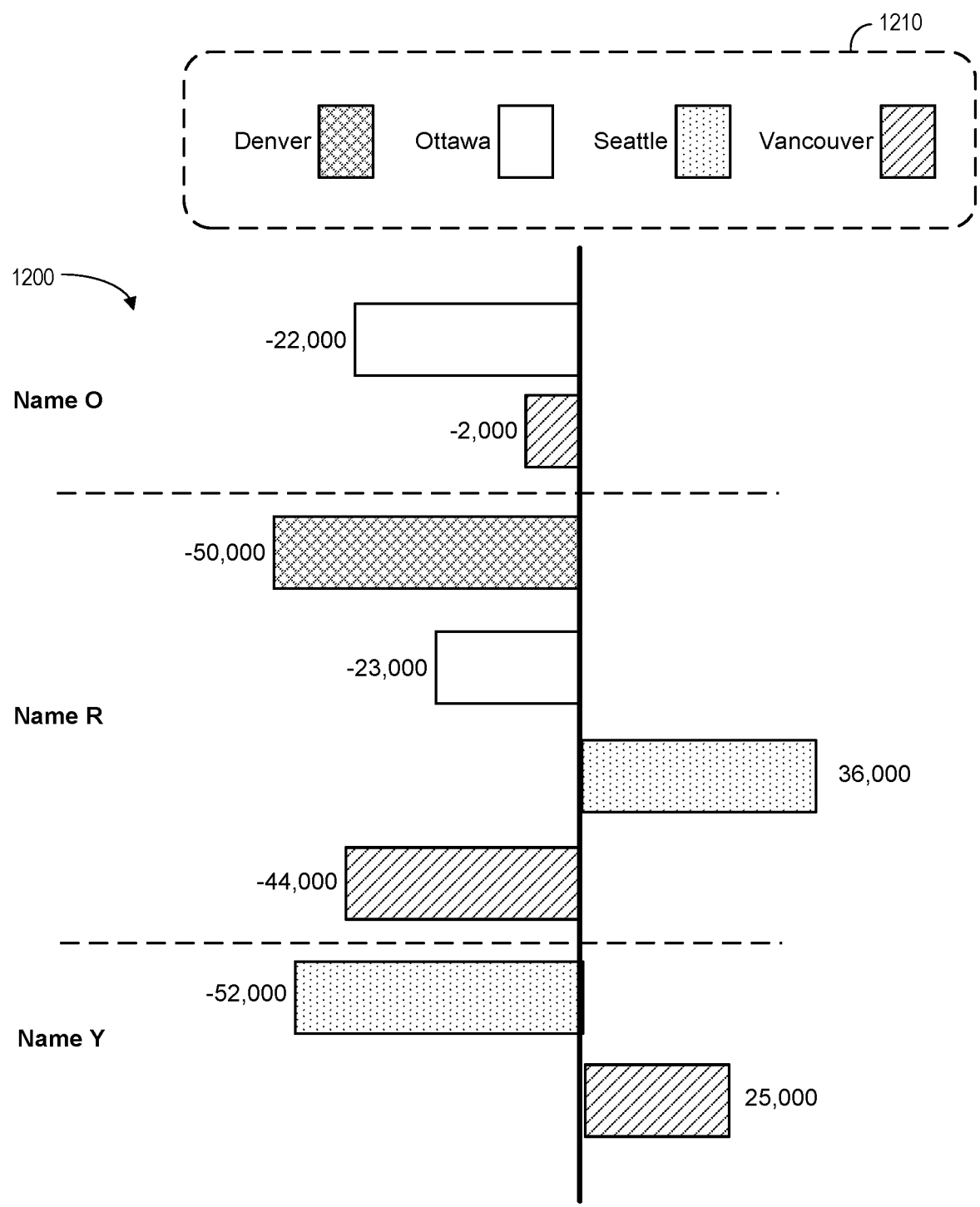
FIG. 12 is an analytic chart in accordance with some embodiments.

FIG. 9 illustrates a user interface 900 according to some embodiments. The user interface 900 includes a drop-down menu 920 (e.g., as part of a context menu 910) where a user can set a user selectable dimension ungrouping indication to "ungroup" (that is, "Ungroup Color Axis" for "Location" as illustrated in FIG. 9) via a touchscreen or computer mouse pointer 930. As a result of this "ungroup" selection, FIG. 10 illustrates an enterprise information data structure re-organization 1000 in accordance with some embodiments. The original chart was described in connection with FIGS. 2 and 3 (and the legend 310 was not in alphabetical order). The re-organization arranges the enterprise information structure such that the innermost dimension information is now arranged on the column axis instead of the row axis (e.g., by adjusting a query to the back-end application computer server). For example, FIG. 11 is a re-organized enterprise information data structure 1100 according to some embodiments. Here, the data structure 1100 now includes the location values ("Seattle," "Vancouver," etc.) arranged on the column axis. In addition, the data structure 1100 executed dimension sorting for row axis and column axis so that dimension members on both axes are displayed in alphabetical order. Note that other types of sorts might be implemented instead (e.g., a complex measure sort based on aggregated income totals on row only or column only). FIG. 12 is an analytic chart 1200 with a legend 1210 representing the data structure of FIG. 11 in accordance with some embodiments. Note that various aspects of the data structure 1100 and chart 1200 can now be sorted as desired by the user (e.g., so that the legend 1210 appears in ascending alphabetical order).

Thus, embodiments may enable a transformation of a query structure through new user interface option in a chart context menu that can select "Ungroup Color Axis." This will move the color dimensions to the column axis, and selecting "Group Color Axis" will move the color dimensions back to the row axis. According to some embodiments, this option is enabled only when:

- the chart type supports rank or sort, and
- there is at least one dimension in color feed that is not duplicated in other dimension type feeds.

Figure 13:
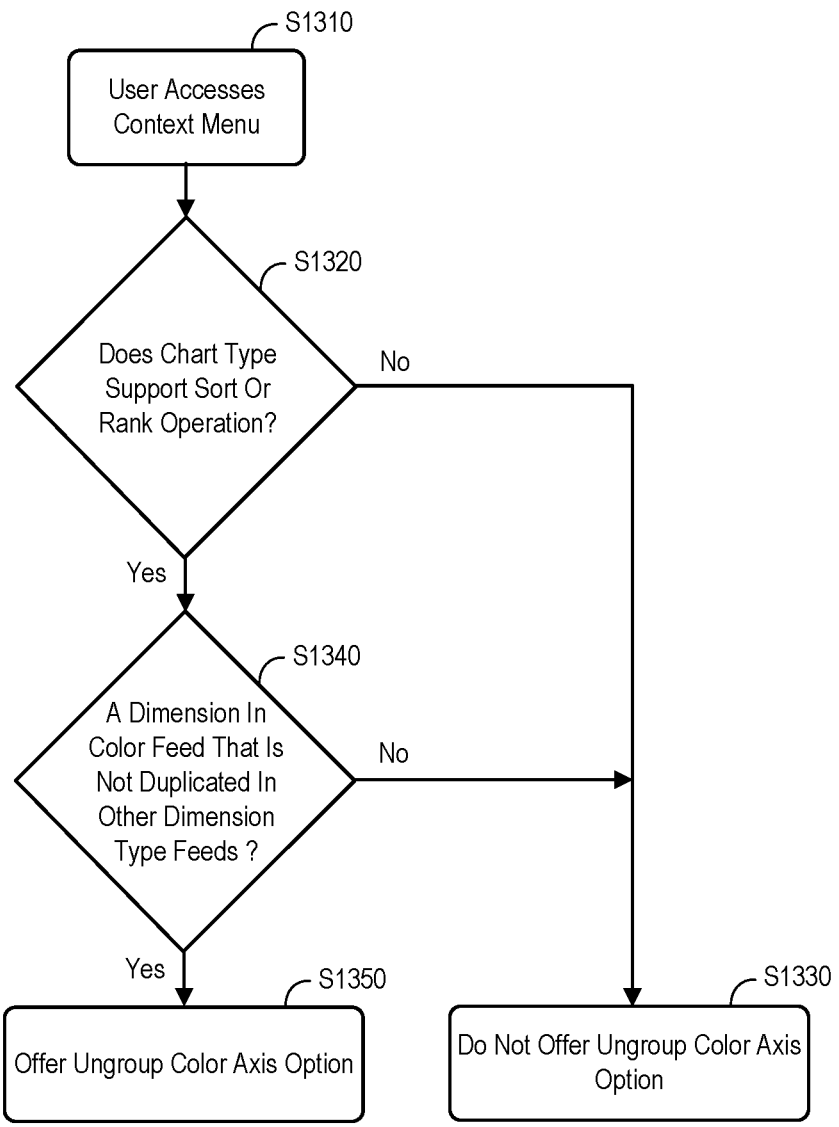
FIG. 13 is a user interface method according to some embodiments.

FIG. 13 is a user interface method according to some embodiments. At S1310, the user accesses a context menu. If the chart type being accessed does not support sort or rank operations at S1320, the "Ungroup Color Axis" option is not offered at S1330. If the chart type being accessed does support sort or rank operations at S1320, it is determined if a dimension in the color feed is not duplicated in other dimension type feeds at S1340. If not, the "Ungroup Color Axis" option is not offered at S1330. If a dimension in the color feed is not duplicated in other dimension type feeds at S1340, the "Ungroup Color Axis" option is offered to the user at S1350.

Figure 14:
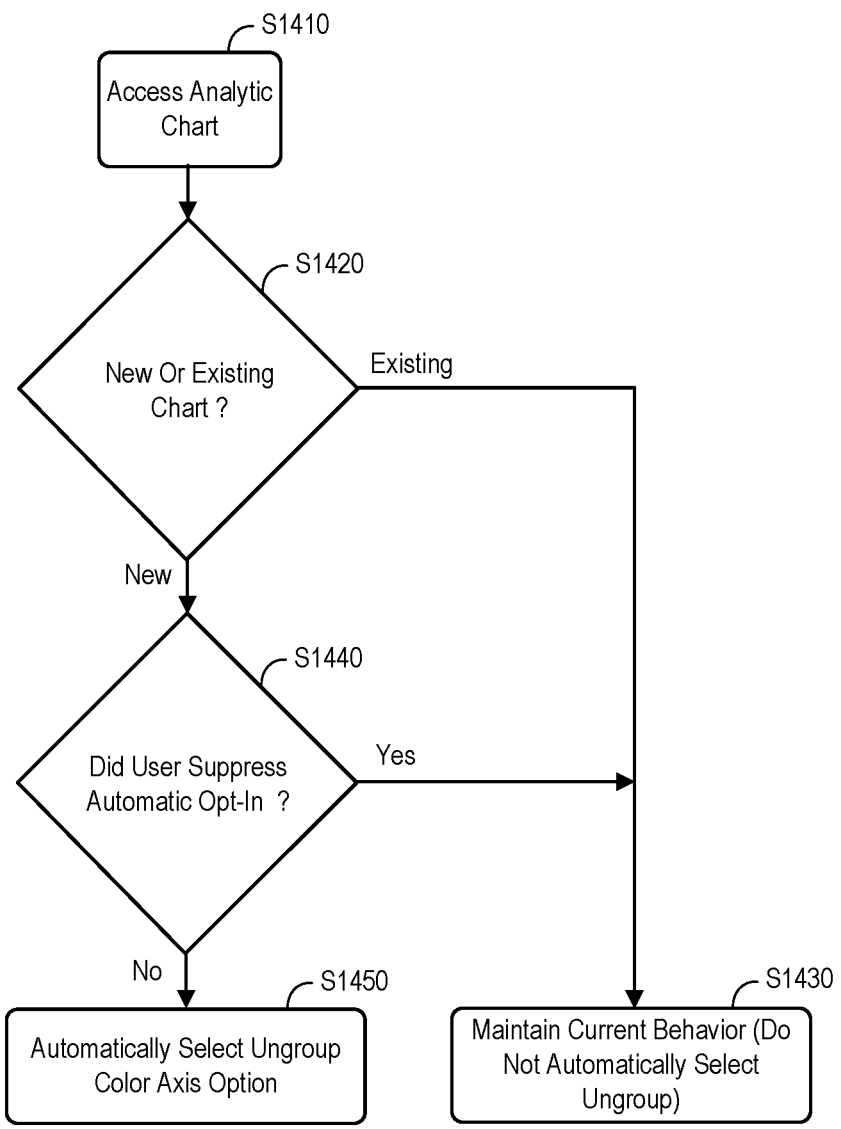
FIG. 14 is an opt-in method in accordance with some embodiments.

Some embodiments may automatically "opt-in" to the new query structure of charts when color feed bindings are updated (e.g., by adding a dimension to the color feed). In some embodiments, new analytic charts have the user selectable dimension ungrouping indication automatically set to "ungroup." Moreover, in some embodiments, the user can suppress the automatic setting of the user selectable dimension ungrouping indication to "ungroup." For example, FIG. 14 is an opt-in method in accordance with some embodiments. At S1410, a user accesses an analytic chart. If the chart being accessed is an existing chart (e.g., a legacy chart) at S1420, the system may maintain current behavior (e.g., by not automatically enabling the "Ungroup" feature) at S1430. If the chart being accessed is a new chart at S1420, it is determined if the user has decided to suppress automatic opt-in for the "Ungroup" feature at S1440. If so, the system may maintain current behavior (e.g., by not automatically enabling the "Ungroup" feature) at S1430. If the user has not decided to suppress automatic opt-in for the "Ungroup" feature at S1440, the system automatically selects the "Ungroup" color axis option of the new analytic chart at S1450.

To make sure the new query structure does not lead to query errors, some embodiments may update rank and sort when updating to the new query structure. For example, measure sorting may switch from a "Datacell" to a "Complex" measure sort when there are dimensions on column. The meaning of the sort changes as the final data would be sorted based on aggregated measure values across each axis. In other embodiments, the sort type remains as a "Measure" sort which handles the new query structure in the same way. Moreover, a rank across all dimensions may create two conditions (one for all dimensions on the row axis, and one for all dimensions on the column axis) to help ensure that rank across all will produce the correct overall top N. Also, when the color dimension is duplicated on a dimension and/or a trellis chart feed, embodiments may keep the dimension on rows axis even if the user opts-in the new query structure (because a dimension can only be on one of the axes—either the row or column axis—and dimension/trellis feeds may have a higher priority as compared to a color feed. In addition to toggling the user interface option, for workflows such as drag-and-drop (or a chart type switch that moves around the bindings), embodiments may also update the query structure and update any rank or sort.

Figure 15:
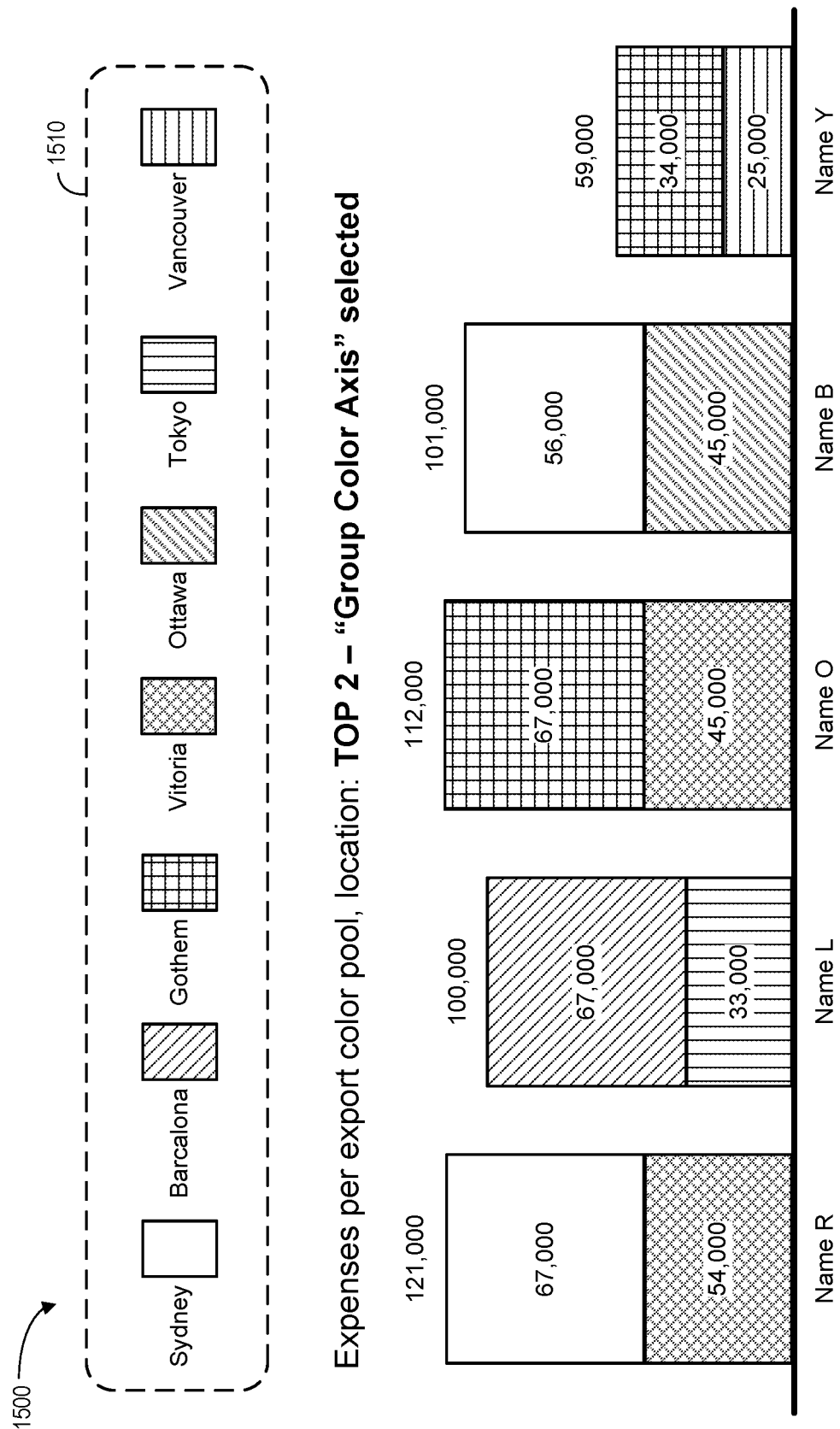
FIG. 15 is an analytic chart showing a "Top N" ranking situation ($\underline{N}$=2) when "Group Color Axis" is selected.

FIG. 15 is an analytic chart 1500 showing a "Top N" ranking situation (N=2) when "Group Color Axis" is selected. Note that a user cannot achieve applying Top N based only on color dimension independent from grouping dimension(s) when there are multiple dimensions used in the chart 1500. For example, if you define Top Non color dimension, you might actually display data for more than N color members because the chart 1500 shows top N color member per outer dimension grouping (as illustrated by the seven locations listed in the legend 1510). That is, the chart 1500 Top 2 rank defined on location (which is the color dimension). However, the chart 1500 displays data for more than 2 locations because the chart 1500 is actually showing the top 2 locations per color pool member.

Figure 16:
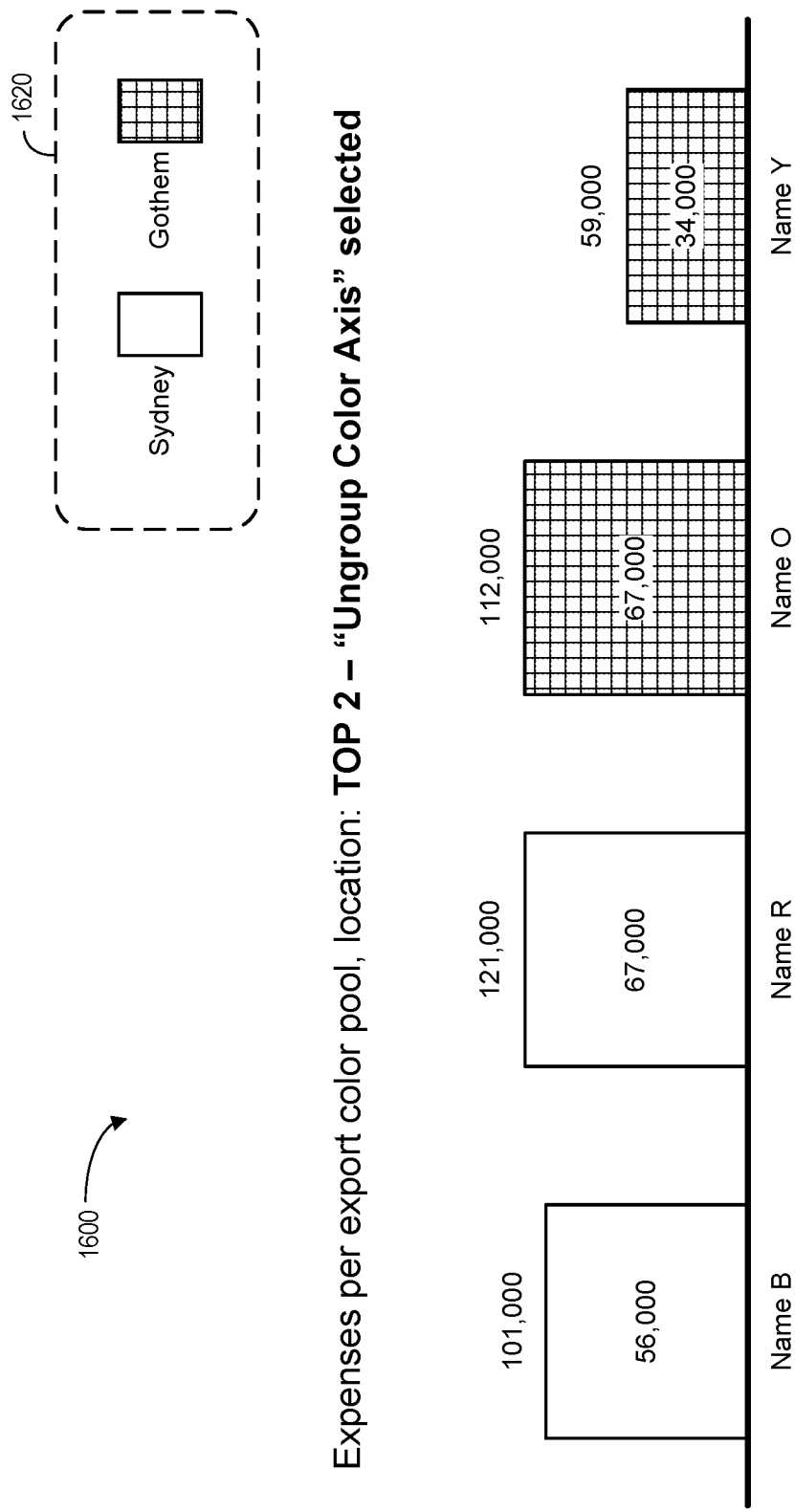
FIG. 16 is an analytic chart showing a "Top N" ranking ($\underline{N}$=2) when "Ungroup Color Axis" is selected in accordance with some embodiments.

FIG. 16 is an analytic chart 1600 showing a "Top N" ranking (N=2) when "Ungroup Color Axis" is selected in accordance with some embodiments. This approach may provide the flexibility to rank the Top N on a color dimension (independent from any outer grouping dimensions). As illustrated in the chart 1600, selecting the "Ungroup Color Axis" feature results in now only 2 locations being shown in the chart 1600 and the legend 1610. That is because when "Ungroup color axis" is selected, the system can now look at the overall values associated with the color dimension and display only the top 2 members.

Figure 17:
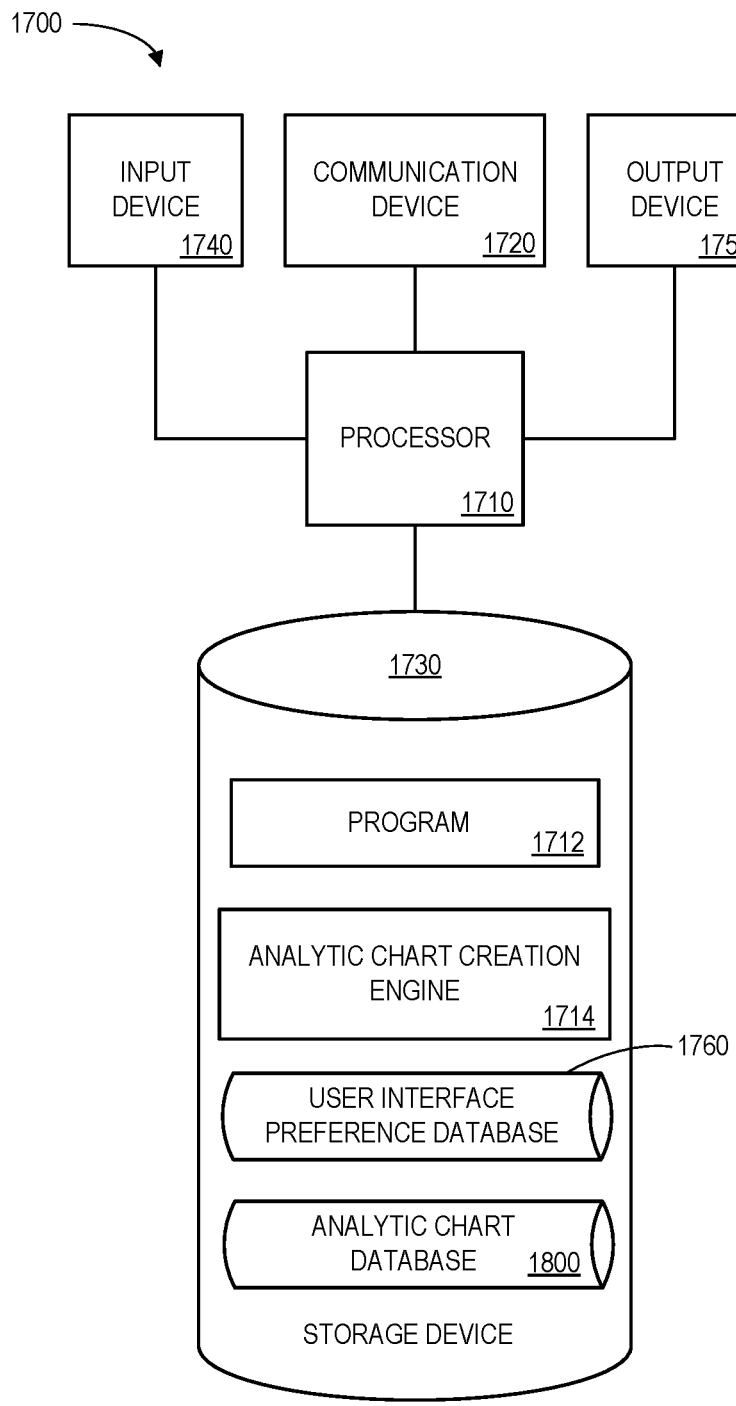
FIG. 17 is an apparatus or platform according to some embodiments.

Note that the embodiments described herein may be implemented using any number of different hardware configurations. For example, FIG. 17 is a block diagram of an apparatus or platform 1700 that may be, for example, associated with the system 100 of FIG. 1 (and/or any other system described herein). The platform 1700 comprises a processor 1710, such as one or more commercially available CPUs in the form of one-chip microprocessors, coupled to a communication device 1720 configured to communicate via a communication network (not shown in FIG. 17). The communication device 1720 may be used to communicate, for example, with one or more remote user platforms, cloud resource providers, etc. The platform 1700 further includes an input device 1740 (e.g., a computer mouse and/or keyboard to input chart options) and/an output device 1750 (e.g., a computer monitor to render a chart, transmit recommendations, and/or create reports). According to some embodiments, a mobile device and/or PC may be used to exchange information with the platform 1700.

The processor 1710 also communicates with a storage device 1730. The storage device 1730 can be implemented as a single database or the different components of the storage device 1730 can be distributed using multiple databases (that is, different deployment information storage options are possible). The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or an analytic chart creation engine 1714 for controlling the processor 1710. The processor 1710 performs instructions of the programs 1712, 1714, and thereby operates in accordance with any of the embodiments described herein. For example, the processor 1710 may determine that the user selectable dimension ungrouping indication is set to "ungroup." Responsive to said determination, the processor 1710 may automatically re-organize an enterprise information structure such that innermost dimension information is arranged on a column axis instead of a row axis. The processor 1710 may then automatically create an analytic chart and transmit the chart to a remote user device.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the platform 1700 from another device; or (ii) a software application or module within the platform 1700 from another software application, module, or any other source.

In some embodiments (such as the one shown in FIG. 17), the storage device 1730 further stores a user interface preference database 1760 and an analytic chart database 1800. An example of a database that may be used in connection with the platform 1700 will now be described in detail with respect to FIG. 18. Note that the database described herein is only one example, and additional and/or different information may be stored therein. Moreover, various databases might be split or combined in accordance with any of the embodiments described herein.

Figure 18:
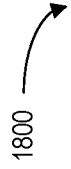
FIG. 18 illustrates an analytic chart database in accordance with some embodiments.

Referring to FIG. 18, a table is shown that represents the analytic chart database 1800 that may be stored at the platform 1700 according to some embodiments. The table may include, for example, entries associated with analytic charts created by/for a user. The table may also define fields 1802, 1804, 1806, 1808, for each of the entries. The fields 1802, 1804, 1806, 1808 may, according to some embodiments, specify: a chart identifier 1802, a data structure 1804, a dimension ungrouping indication 1806, and a chart type 1808. The analytic chart database 1800 may be created and updated, for example, when a new chart is created, an existing chart is updated, etc.

The chart identifier 1802 may be a unique alphanumeric identifier that is associated with a particular analytics chart created by/for a user. The data structure 1804 may comprise a result set that was returned by a back-end application computer server in response to a query. The dimension ungrouping indication 1806 indicates if the user has turned the "ungroup" feature on (or off). When the "ungroup" feature is turned on, the data structures 1804 will be re-organized such that an innermost (color) dimension is arranged on a column axis instead of a row axis. The chart type 1808 may indicate the type of analytic chart that is rendered (e.g., a comparison chart, a trend chart, a distribution chart, a correlation chart, an indicator chart, etc.).

Thus, embodiments may provide flexible analytic charts in an automatic and appropriate manner. Moreover, embodiments may provide flexibility to rank the Top N elements on a color dimension.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
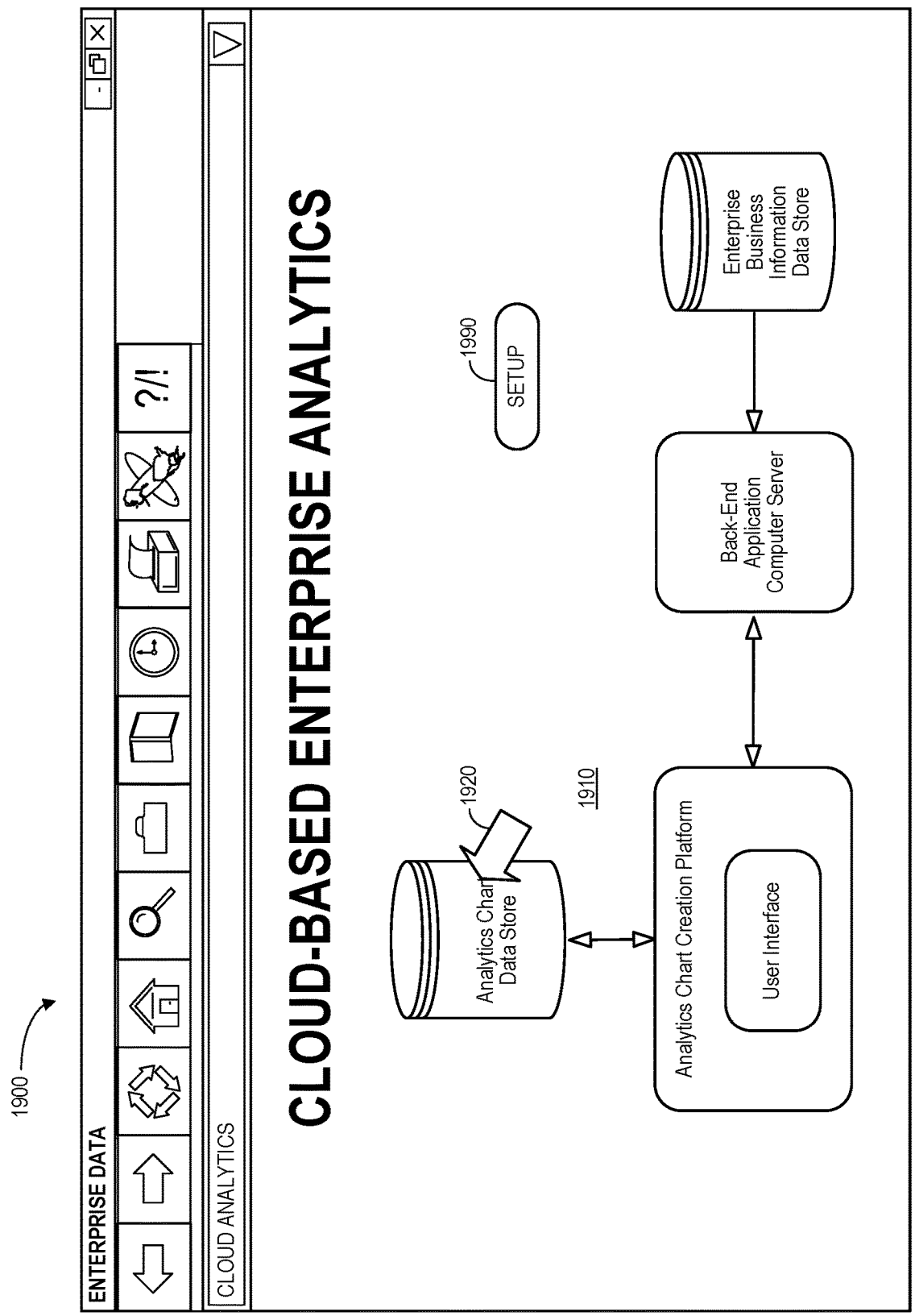
FIG. 19 is a cloud-based enterprise analytics display according to some embodiments.
Figure 20:
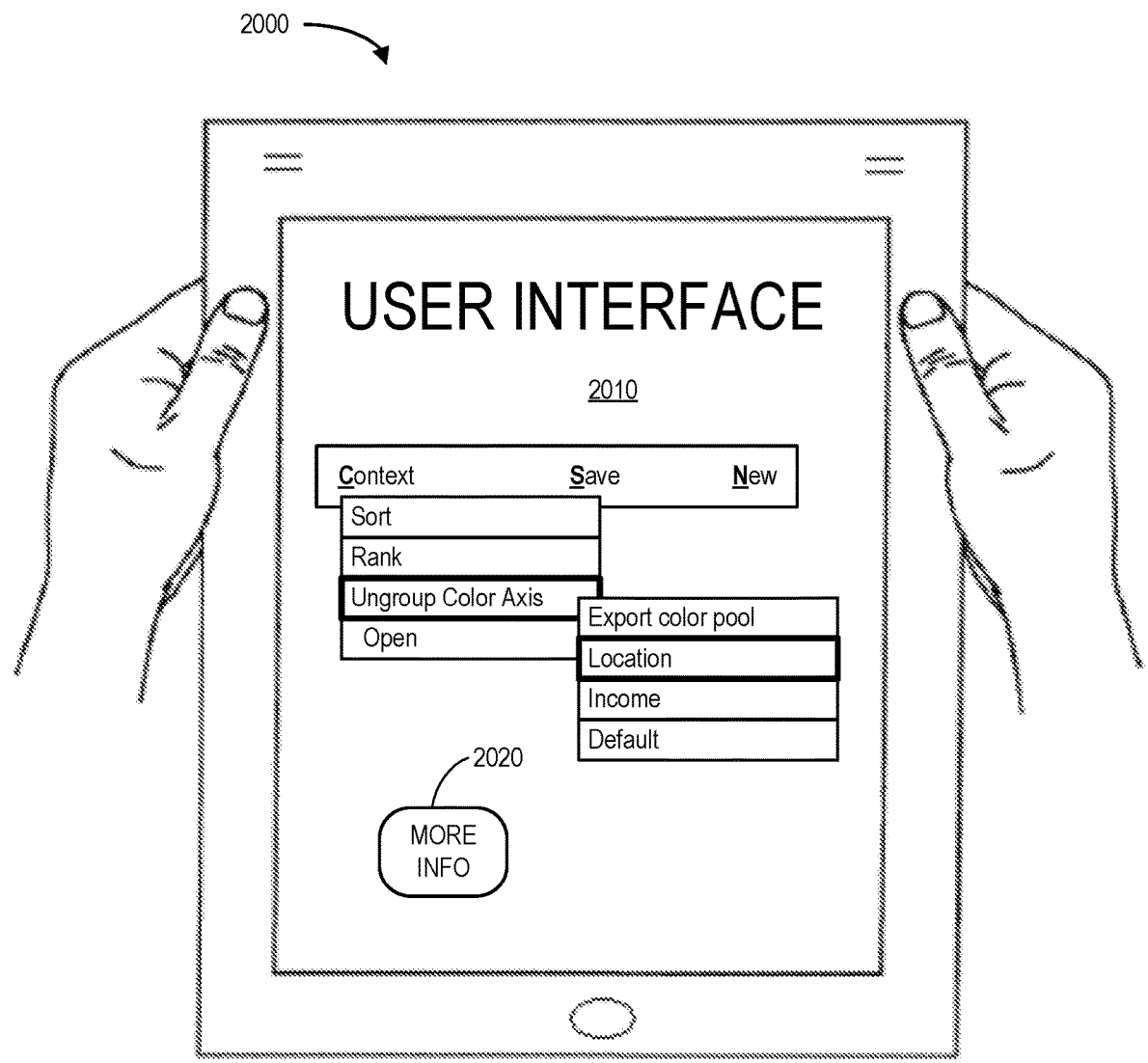
FIG. 20 is a handheld tablet computer in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 19 is a human machine interface display 1900 according to some embodiments. The display 1900 includes a graphical representation 1910 of elements of an analytic chart creation system. Selection of an element (e.g., via a touchscreen or computer pointer 1920) may result in display of a popup window containing various options (e.g., to adjust chart preferences, add or remove dimensions, etc.). The display 1900 may also include a user-selectable "Setup" icon 1900 (e.g., to configure parameters to alter or adjust processes as described with respect any of the embodiments described herein). FIG. 20 shows a handheld tablet computer 2000 rendering a user interface display 2010 that may be used to select (or deselect) an "ungroup" option for a data structure and/or to request additional parameters such as measures (e.g., via a "More Info" icon 2020).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with cloud-based enterprise analytics, comprising:
    an analytic chart data store that contains an enterprise information data structure, based on a result set received from a back-end application computer server, wherein the enterprise information data structure includes:
        an outermost dimension arranged on a row axis,
        an innermost dimension arranged on the row axis comprising an enterprise color feed, and
        measure values arranged on the row axis; and
    an analytic chart creation platform coupled to the analytic chart data store and including:
        a computer processor, and
        a memory storage device coupled to the computer processor and including instructions that, when executed by the computer processor, enable the analytic chart creation platform to:
            determine that a user associated with a remote user device is accessing a context menu,
            automatically provide an "ungroup" option on the context menu to the user if, and only if, both (i) a chart type supports a sort or rank operation, and (ii) there is at least one dimension in the color feed that is not duplicated in other dimension type feeds,
            responsive to the user selecting the "ungroup" option, automatically re-organize the enterprise information structure by adjusting a query to the back-end application computer server such that the innermost dimension information is arranged on the column axis instead of the row axis,
            automatically create an analytic chart based on the re-organized enterprise information data structure, and
            transmit the created analytic chart to the remote user device via a distributed communication network.

2. The system of claim 1, wherein the analytic chart creation platform subsequently determines that the user has now selected a "group" option and again re-organizes the enterprise information data structure such that the innermost dimension information is arranged on the row axis instead of the column axis.

3. The system of claim 1, wherein the analytic chart creation platform performs a sort operation on the re-organized enterprise information data structure.

4. The system of claim 1, wherein the analytic chart creation platform performs a rank operation on the re-organized enterprise information data structure.

5. The system of claim 1, wherein new analytic charts have the user selectable dimension ungrouping indication automatically set to "ungroup".

6. The system of claim 5, wherein the user can suppress the automatic setting of the user selectable dimension ungrouping indication to "ungroup".

7. A computer-implemented method associated with cloud-based enterprise analytics, comprising:
    accessing, by a computer processor of an analytic chart creation platform, an analytic chart data store that contains an enterprise information data structure, based on a result set received from a back-end application computer server, wherein the enterprise information data structure includes:
        an outermost dimension arranged on a row axis,
        an innermost dimension arranged on the row axis comprising an enterprise color feed, and
        measure values arranged on the row axis;
    determining that a user associated with a remote user device is accessing a context menu;
    automatically providing an "ungroup" option on the context menu to the user if, and only if, both (i) a chart type supports a sort or rank operation, and (ii) there is at least one dimension in the color feed that is not duplicated in other dimension type feeds;
    responsive to the user selecting the "ungroup" option, automatically re-organizing the enterprise information structure by adjusting a query to the back-end application computer server such that the innermost dimension information is arranged on the column axis instead of the row axis;
    automatically creating an analytic chart based on the re-organized enterprise information data structure; and
    transmitting the created analytic chart to the remote user device via a distributed communication network.

8. The method of claim 7, wherein the analytic chart creation platform subsequently determines that the user has now selected a "group" option and again re-organizes the enterprise information data structure such that the innermost dimension information is arranged on the row axis instead of the column axis.

9. The method of claim 7, wherein the analytic chart creation platform performs a sort operation on the re-organized enterprise information data structure.

10. The method of claim 7, wherein the analytic chart creation platform performs a rank operation on the re-organized enterprise information data structure.

11. The method of claim 7, wherein new analytic charts have the user selectable dimension ungrouping indication automatically set to "ungroup".

12. The method of claim 11, wherein the user can suppress the automatic setting of the user selectable dimension ungrouping indication to "ungroup".

13. A non-transitory, computer readable medium having executable instructions stored therein that, when executed by a computer processor cause the processor to perform a method associated with cloud-based enterprise analytics, the method comprising:
- accessing, by a computer processor of an analytic chart creation platform, an analytic chart data store that contains an enterprise information data structure, based on a result set received from a back-end application computer server wherein the enterprise information data structure includes:
  - an outermost dimension arranged on a row axis,
  - an innermost dimension arranged on the row axis comprising an enterprise color feed, and
  - measure values arranged on the row axis;
- responsive to the user selecting the "ungroup" option, automatically re-organizing the enterprise information structure by adjusting a query to the back-end application computer server such that the innermost dimension information is arranged on the column axis instead of the row axis;
- automatically creating an analytic chart based on the re-organized enterprise information data structure; and
- transmitting the created analytic chart to the remote user device via a distributed communication network.

14. The medium of claim 13, wherein the analytic chart creation platform subsequently determines that the user has now selected a "group" option and again re-organizes the enterprise information data structure such that the innermost dimension information is arranged on the row axis instead of the column axis.

15. The medium of claim 13, wherein the analytic chart creation platform performs a sort operation on the re-organized enterprise information data structure.

16. The medium of claim 13, wherein the analytic chart creation platform performs a rank operation on the re-organized enterprise information data structure.

* * * * *